United States Patent [19]
Yokogawa et al.

[11] Patent Number: 5,740,152
[45] Date of Patent: Apr. 14, 1998

[54] SPINDLE SERVO CIRCUIT IN AN APPARATUS FOR PLAYING AN OPTICAL DISK HAVING SYNCHRONOUS MARKS AND DATA MARKS SATISFYING CERTAIN CRITERIA

[75] Inventors: Fumihiko Yokogawa; Hideki Hayashi, both of Tsurugashima, Japan

[73] Assignee: Pioneer Electronic Corporation, Tokyo, Japan

[21] Appl. No.: 794,018

[22] Filed: Feb. 3, 1997

Related U.S. Application Data

[63] Continuation of Ser. No. 699,191, Aug. 19, 1996, Pat. No. 5,629,924, which is a continuation of Ser. No. 337,229, Nov. 7, 1994, abandoned.

[30] Foreign Application Priority Data

Nov. 11, 1993  [JP]  Japan .................................. 5-282514

[51] Int. Cl.$^6$ ........................................ G11B 7/24
[52] U.S. Cl. ........................ 369/275.3; 369/275.4; 369/13
[58] Field of Search ..................... 369/275.3, 275.4, 369/275.2, 13, 32, 124, 48, 59, 116, 47, 54, 44.28, 44.26, 44.36

[56] References Cited

U.S. PATENT DOCUMENTS

| | | | |
|---|---|---|---|
| 4,523,304 | 6/1985 | Satoh et al. | 369/32 |
| 5,381,397 | 1/1995 | Okada | 369/124 |
| 5,418,770 | 5/1995 | Ide et al. | 369/116 |
| 5,623,478 | 4/1997 | Horimai | 369/275.4 |

*Primary Examiner*—Ali Neyzari
*Attorney, Agent, or Firm*—Sughrue, Mion, Zinn, Macpeak & Seas, PLLC

[57] ABSTRACT

An optical disk having a recording format for a sampled servo system and including a servo field which is preformatted, including synchronous marks for synchronizing detection, and a data field for recording data on each track. The length of the synchronous mark is defined to render the detection of the synchronous pattern possible by making it easily distinguishable from the maximum inversion interval in the data even if the optical disk is of the constant-linear-velocity (CLV) type.

2 Claims, 3 Drawing Sheets

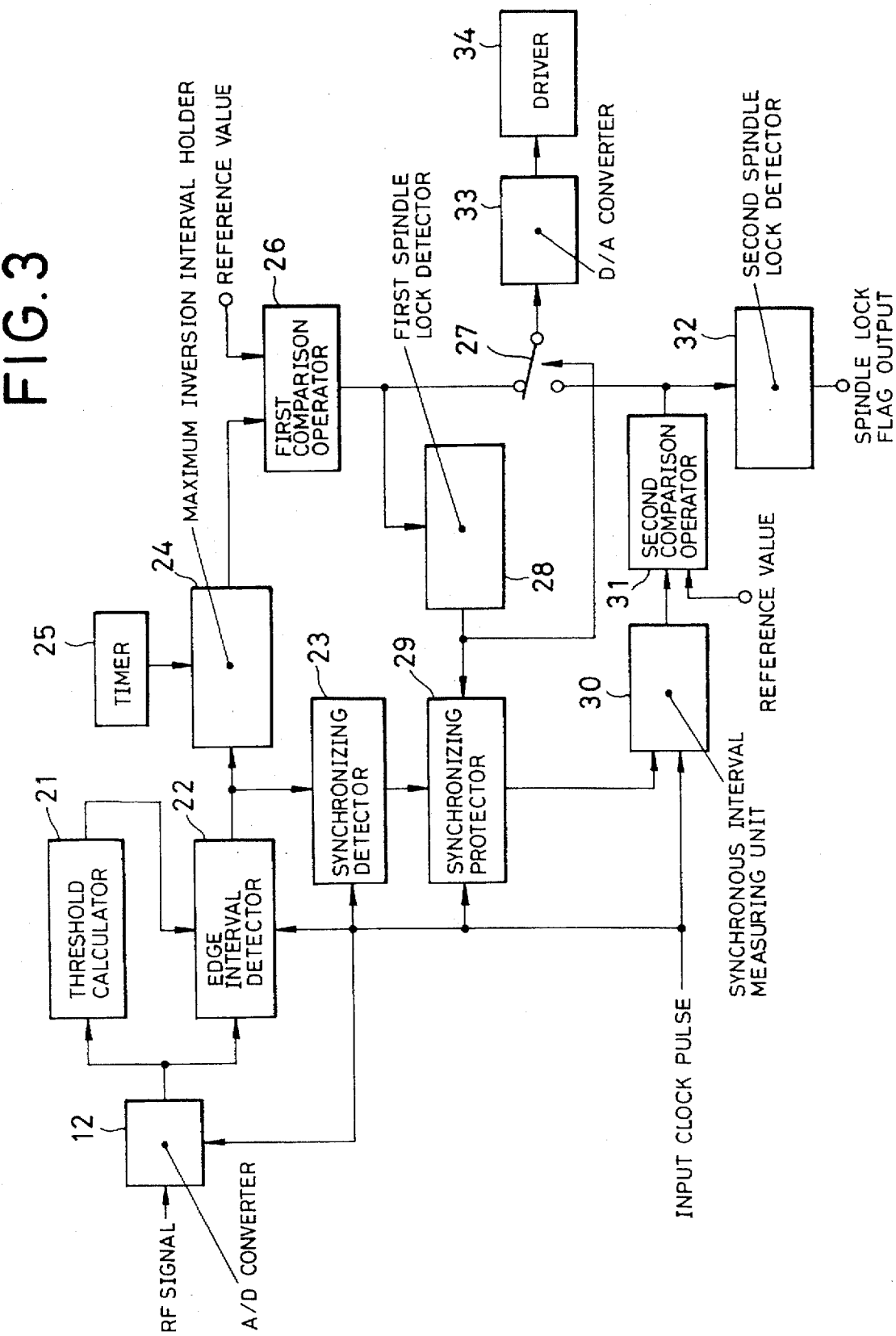

SPINDLE SERVO CIRCUIT IN AN APPARATUS FOR PLAYING AN OPTICAL DISK HAVING SYNCHRONOUS MARKS AND DATA MARKS SATISFYING CERTAIN CRITERIA

This is a continuation of application Ser. No. 08/699,191, filed Aug. 19, 1996 now U.S. Pat. No. 5,629,924, which is a continuation of application Ser. No. 08/337,229, filed Nov. 7, 1994 now abandoned.

BACKGROUND OF THE INVENTION

1. Field of the Invention

This invention relates to an optical disk having a synchronous mark for synchronizing detection and a data field for recording data on each track.

2. Description of the Related Background Art

In an optical disk having a recording format for a sampled servo system, a synchronous pattern provided with two marks (pits) is formed on the track of each servo field in order to obtain synchronizing signals for reading recorded data. The distance between the two marks is made longer than the maximum inversion interval which is the maximum distance between marks in the marked portion indicating the data. For example, the distance is longer than the maximum inversion interval by 1T (where the T is one pit interval). When the disk is played, a reading operation is performed, at first, while the servo system is being operated by asynchronous master clock pulses, thus detecting the synchronous pattern from the read signal. After the detection of the synchronous pattern, a clock mark is detected from the read signal. In synchronism with the detection of the clock mark, a clock pulse is generated in a PLL circuit (phase-lock-loop circuit). Clock pulses reproduced for reading the data are obtained from the PLL circuit when the PLL circuit arrives at its locked state.

In the case of an optical disk of a CAV (Constant Angular Velocity) type, where the rotational speed is constant, it is easy to detect the synchronous pattern from its length after the rotational speed has once reached the constant speed. As a result, it is possible to reproduce the clock pulses from the read signal as described above.

However, in the case of the optical disk of the CLV type, where its linear velocity is constant, the rotational speed of the spindle is not constant as the disk is driven to rotate. Therefore, it is not easy to detect the synchronous pattern merely from its length. The portion of the maximum inversion interval must be detected by counting the master clock pulses to servo-control the spindle so that such portion should be provided with a predetermined temporal length rather than linear length. Thus, if the maximum inversion interval in the data is given as kT, and the length of the synchronous pattern is one pit interval longer, as stated above, i.e., (k+1) T, then the length of the synchronous pattern becomes (k+1) T±0.5T. The 0.5T is included to factor in error due to the asynchronous master clock pulses when it is intended to detect the synchronous pattern by using master clock pulses having double frequency. If, in addition the rotational error of the spindle is 0.5T or more, then the counted value by the master clock pulses of the synchronous pattern could possibly yield a value kT. Therefore, since kT also corresponds to the length of the maximum inversion interval in the case of the optical disk of the CLV type, a problem arises in that it is not easy to detect the synchronous pattern because it is hard to distinguish from the maximum inversion interval in the data.

SUMMARY OF THE INVENTION

Therefore, it is an object of this invention to provide an optical disk in which it is easy to detect the synchronous pattern and discriminate it from the maximum inversion interval in the data, even if the disk is of the CLV type.

The optical disk according to the present invention comprises servo fields having a sampled servo type recording format, which are preformatted to include synchronous marks for performing synchronizing detection, and data fields provided for each track for recording data. In this disk, if one pit interval of data is given as T, the length of the synchronous mark in the direction of the track is given as nT (where n is an integer), the detection error that may be generated in reading the synchronous mark for detection is given as αT, and the maximum inversion interval for marks in the data field is given as mT (where m is an integer), then an integer n is defined to satisfy the following two expressions:

$$(n-\alpha)T > mT$$

$$mT \times (n+\alpha)/n < nT$$

where $\alpha \geq 2$.

BRIEF DESCRIPTION OF THE DRAWINGS

FIG. 3 is a block diagram showing a spindle servo circuit.

DETAILED DESCRIPTION OF THE PREFERRED EMBODIMENT

Hereinafter, with reference to the accompanying drawings, the detailed description will be given of an embodiment according to the present invention.

Figure 1A:
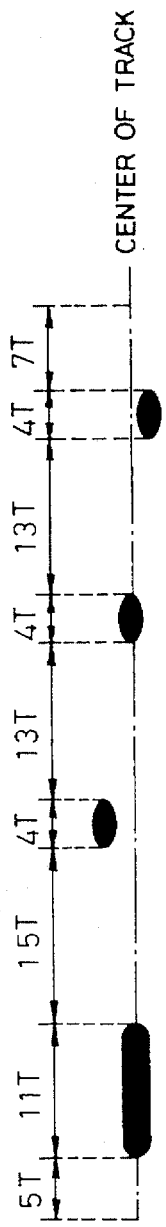
FIG. 1A and FIG. 1B are views showing a servo field of an optical disk according to the present invention.
Figure 1B:
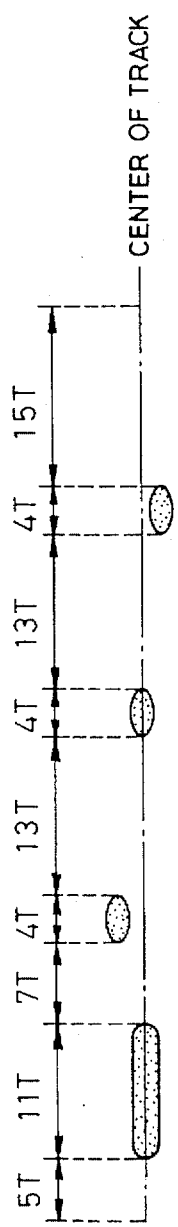

FIG. 1A and FIG. 1B are views showing a servo field of an optical disk of a CLV type for a double density recording as an embodiment according to the present invention. In the optical disk, each track is formed at intervals of 0.4 μm, for example. As shown in FIG. 1A and FIG. 1B, a synchronous pit having a length of 11T (where T is one pit interval) at the head of the servo field of each track, and following this, a plurality of pits are formed for performing tracking servo control. The pit width of the synchronous pit is 0.2 μm, for instance. In each of the servo fields of odd numbered tracks, as shown in FIG. 1A, a first tracking pit having a length of 4T is positioned as a wobble pit apart from the rear edge of the synchronous pit by 15T on the left side to the center of the track in the direction toward the terminal of the segment. A clock pit having a length of 4T is positioned on the track apart from the rear edge of the first tracking pit by 13T. Further, a second tracking pit having a length of 4T is positioned as a wobble pit apart from the rear edge of the clock pit by 13T on the right side to the center of the track in the direction toward the terminal of the segment. In each of the servo fields of even numbered tracks, as shown in FIG. 1B, a first tracking pit having a length of 4T is positioned as a wobble pit apart from the rear edge of the synchronous pit by 7T on the left side to the center of the track in the direction toward the terminal of the segment. A clock pit having a length of 4T is positioned on the track apart from the rear edge of the first tracking pit by 13T.

Further, a second tracking pit having a length of 4T is positioned as a wobble pit apart from the rear edge of the clock pit by 13T on the right side to the center of the track in the direction toward the terminal of the segment. The wobble pit is centrally formed at a position shifted from the center of the track by 0.2 μm, for instance. A data field (not shown) is positioned following such a servo field.

Figure 2:
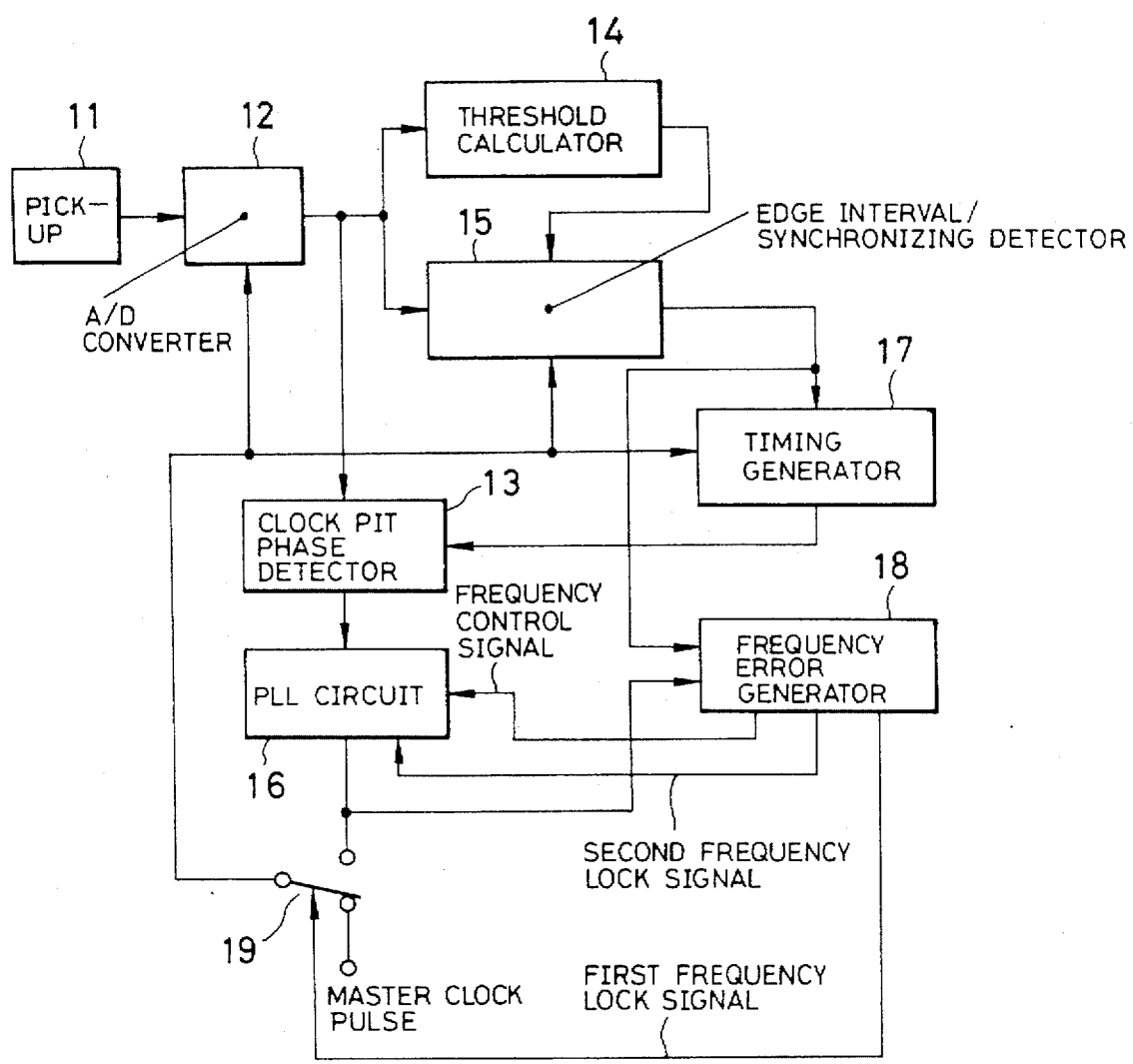
FIG. 2 is a block diagram showing a circuit for generating clock pulses.

FIG. 2 shows a circuit for generating the clock pulses which control timing of data reproduction in accordance with the read signal from an optical disk having the servo field shown in FIG. 1. In the clock pulse generating circuit, an optical beam is irradiated from a pickup 11 onto the disk for reading information. An RF signal, that is, a signal read from the disk by the pickup 11, is supplied to an A/D converter 12. The RF signal is converted into a digital RF signal by the A/D converter 12, and supplied to a clock pit phase detector 13, threshold calculator 14, and edge interval/ synchronizing detector 15. In accordance with a clock sampling signal, described below, the clock pit phase detector 13 obtains from the digital RF signal the phase error signals which indicate differences in the sample values before and after the clock pit waveform. A PLL circuit 16 is connected to the clock pit phase detector 13. The PLL circuit 16 generates reproduction clock pulses and supplies them to a change-over switch 19, in order to control the phase or frequency of the reproduction clock pulses in accordance with either the phase error signals or a frequency control signal which will be described later. The change-over switch 19 selectively outputs the reproduction clock pulses output from the PLL circuit 16 or outputs master clock pulses, in response to a first frequency lock signal which will be described later. The master clock pulses are generated by a pulse generator which is not shown. The clock pulses selectively output from the change-over switch 19 are supplied to the A/D converter 12, to the edge interval/ synchronizing detector 15, and to a timing generator 17.

The threshold calculator 14 detects positive and negative peak levels of the digital RF signal per given cycle, and calculates an intermediate value of the positive and negative levels as a threshold level. When a digital RF signal that exceeds the threshold level is detected, the edge interval/ synchronizing detector 15 obtains the period of time such level is exceeded by counting the clock pulses from the change-over switch 19, and then generates a synchronous detection signal indicative of detection of a synchronous pit if the counted value of the clock pulses is more than a first predetermined value.

To the edge interval/synchronizing detector 15 are connected the timing generator 17 and a frequency error generator 18. The timing generator 17 counts the clock pulses from the change-over switch 19 from the time at which the synchronous detection signal is generated, and generates the above-mentioned clock sampling signal in order to supply the clock sampling signal to the clock pit phase detector 13. The frequency error generator 18 obtains the intervals between synchronous signals by counting the reproduction clock pulses from the PLL circuit 16 in response to the synchronous detection signal, and then compares the counted value of the reproduction clock pulses with a second predetermined value, hence generating the frequency control signal in accordance with the result of the comparison. The frequency control signal is supplied to the PLL circuit 16. The frequency of the reproduction clock pulses is controlled in accordance with the frequency control signal. Also, the frequency error generator 18 generates a first frequency lock signal when the frequency of the reproduction clock pulses enters the first predetermined range, and generates a second frequency lock signal if the frequency enters a second predetermined range that is narrower than the first predetermined range. The first frequency lock signal is supplied to the change-over switch 19, and the second frequency lock signal is supplied to the PLL circuit 16.

In the clock pulse generator with such constitution, the change-over switch 19 selectively outputs the master clock pulses in the initial state. Thus, the A/D converter 12 obtains the sample value from the RF signal read from the disk by the pickup 11 in response to the master clock pulses and digitizes it. The intermediate value of the positive and negative peak levels of the digital RF signal is calculated by the threshold calculator 14 as a threshold level. When the digital RF signal which exceeds such threshold level is detected, the period of time during which the RF signal exceeded this level is obtained by the edge interval/ synchronizing detector 15 by counting the master clock pulses accordingly.

The edge interval/synchronizing detector 15 generates the synchronous detection signal if the counted value of the master clock pulse is more than the first predetermined value. On the basis of the time at which the synchronizing detection signal is generated, the timing generator 17 counts the master clock pulses and generates the clock sampling signal which indicates the time at which the clock pit has been read. The clock sampling signal is supplied to the clock pit phase detector 13. In accordance with the clock sampling signal thus received, the clock pit phase detector 13 obtains, from the digital RF signal, the phase error signal which indicates the difference in the sample values before and after the clock pit waveform.

The reproduction clock pulses generated by the PLL circuit 16 are supplied to the frequency error generator 18, and the interval between the synchronous signals is determined by counting the reproduction clock pulses from the PLL circuit 16 in response to the synchronous detection signal. The counted value of the clock pulses is compared with the second predetermined value, and the frequency control signal is generated in accordance with the result of the comparison. In the initial state, the frequency control signal controls the frequency of the reproduction clock pulses of the PLL circuit 16, forming a frequency control loop. The frequency error generator 18 generates the first frequency lock signal when the reproduction clock pulses enter the first predetermined frequency range. In response to the first frequency lock signal, the change-over switch 19 switches, to then relay and supply the reproduction clock pulses output from the PLL circuit 16 to the A/D converter 12, edge interval/synchronizing detector 15, and timing generator 17. Therefore, the A/D converter 12, edge interval/ synchronizing detector 15, and timing generator 17 are actuated in response to the reproduction clock pulses in place of the master clock pulses.

The accuracy of the reproduction clock pulses controlled by the frequency control signal becomes higher as greater numbers of the synchronous signals are detected. When the frequency of the reproduction clock pulses enters the second predetermined range, the second frequency lock signal is generated. In response to the second frequency lock signal, the phase of the reproduction clock pulses is controlled in the PLL circuit 16 in accordance with the phase error signal from the clock pit phase detector 13 in place of the frequency control signal. Hence, the clock pulse generator of FIG. 2 enters a phase control loop state.

FIG. 3 shows a spindle servo circuit which controls the rotational speed of the optical disk represented in FIG. 1. In the spindle servo circuit, a threshold calculator 21 and an edge interval detector 22 are connected to the output of the A/D converter 12. The threshold calculator 21 detects positive and negative peak levels of the digital RF signal output from the A/D converter 12 per given cycle, and calculates the intermediate value of the positive and negative peak levels as a threshold level. When the digital RF signal exceeding the threshold level is detected, the edge interval detector 22 obtains the time during which the RF signal exceeds that level by counting the clock pulses input from the change-over switch 19 of the clock pulse generator of FIG. 2. A synchronizing detector 23 and a maximum inversion interval holder 24 are connected to the output of the edge interval detector 22. The synchronizing detector 23 generates a synchronizing detection signal when the counted value of the clock pulses obtained by the edge interval detector 22 is more than a first predetermined value. The maximum inversion interval holder 24 holds the maximum value of the counted values of the input clock pulses obtained by the edge interval detector 22 as a maximum inversion interval. The value held by the maximum inversion interval holder 24 is reset by an output of a timer 25. The timer 25 measures a time period greater than the cycle in which the synchronous pit is read when the optical disk is played. The timer 25 generates a reset signal when measurement of the time period is completed, and repeats the time measuring operation. A first comparison operator 26 is connected to the maximum inversion interval holder 24. The first comparison operator 26 compares a reference value and the maximum inversion interval value held by the maximum inversion interval holder 24, and outputs an error signal. The reference value corresponds to the length, 11T, of the synchronous pit.

The error signal output from the first comparison operator 26 is supplied to a change-over switch 27 and a first spindle lock detector 28. The first spindle lock detector 28 generates an enabling signal when the level of the error signal output from the first comparison operator 26 is within a third predetermined range, and supplies it to the change-over switch 27 and to a synchronizing protector 29. The synchronizing protector 29 outputs the synchronizing detection signal generated by the synchronizing detector 23 when the enabling signal is present. If the enabling signal is absent, the protector 29 outputs a pulse signal per interval at which the synchronizing signal is generated in response to input clock pulses instead. A synchronous interval measuring unit 30 is connected to the synchronizing protector 29. The synchronous interval measuring unit 30 obtains the intervals at which the output signal of the synchronizing protector 29 is generated, by counting the clock pulses, and supplies the counted clock pulses to a second comparison operator 31. The second comparison operator 31 compares a reference value with the value of the input clock pulses counted by the synchronous interval measuring unit 30, and outputs an error signal. The reference value is equivalent to the counted value obtainable when the spindle motor rotates at normal speed. To the output of the second comparison operator 31 are connected a second spindle lock detector 32 together with the change-over switch 27. The second spindle lock detector 32 issues a spindle lock flag when the level of the error signal output from the second comparison operator 31 enters a fourth predetermined range. The change-over switch 27 relays and outputs, as a spindle control signal, the output signal of the first comparison operator 26 if the enabling signal is absent. When the enabling signal is present, the switch 27 relays and outputs the output signal of the second comparison operator 31 as the spindle control signal. The relayed output of the change-over switch 27 is supplied to a driver 34 of the spindle motor (not shown) through a D/A converter 33.

Incidentally, although the threshold calculator 21 is arranged separately, it may be possible to use the threshold calculator 14 shown in FIG. 2. Also, it may be possible to use the edge interval/synchronizing detector 15 shown in FIG. 2 for the edge interval detector 22 and the synchronizing detector 23.

In the spindle servo circuit constituted as described above, the input clock pulses are preferably supplied from the above-described clock pulse generator of FIG. 2. As a result, in the initial state, the generation of the spindle control signal is actuated in response to the master clock pulses. In other words, the A/D converter 12 obtains the sample value from the RF signal read from the disk by the pickup 11 in accordance with the master clock pulses and digitizes it. The intermediate value of the positive and negative peak levels of the digital RF signal is calculated by the threshold calculator 21 as a threshold level. When a digital RF signal exceeding the threshold level is detected, the duration of the signal exceeding that level is obtained in the edge interval detector 22 by counting the master clock pulses. The synchronizing detector 23 generates the synchronizing detection signal when the counted value of the master clock pulses is more than the first predetermined value.

The counted value of the master clock pulses obtained by the edge interval detector 22 is held by the maximum inversion interval holder 24. The edge interval detector 22 outputs the counted values of the master clock pulses one after another, and if the value of the master clock pulse currently counted is greater than the value held by the maximum inversion interval holder 24, the currently counted value is held anew by the maximum inversion interval holder 24. The value held by the maximum inversion interval holder 24 is compared with the reference value in the first comparison operator 26, and the error signal thereof is supplied to the D/A converter 33 through the change-over switch 27 as a spindle control signal. Then, the driver 34 drives the spindle motor in accordance with the spindle control signal, which is an analog signal output by the D/A converter 33.

When the level of the spindle control signal from the first comparison operator 26 is within the third predetermined range, the first spindle lock detector 28 generates an enabling signal. When the enabling signal is generated, the change-over switch 27 relays the output signal from the second comparison operator 31 at that time, and the synchronizing protector 29 outputs the synchronizing detection signal generated in the synchronizing detector 23 to the synchronous interval measuring unit 30. The synchronous interval measuring unit 30 obtains the intervals at which the output signals of the synchronizing protector 29 are generated, by counting the input clock pulses. The counted value of the input clock pulses and the reference value are compared in the second comparison operator 31 to output an error signal. The error output from the second comparison operator 31 is supplied to the D/A converter 33 through the change-over switch 27 as a spindle control signal. The driver 34 drives the spindle motor in accordance with the spindle control signal, which is rendered an analog signal by the D/A converter 33.

Also, the spindle lock flag is issued from the second spindle lock detector 32 when the level of the spindle control signal output from the second comparison operator 31 is within the fourth predetermined range. The spindle lock flag is supplied to a system controller (not shown) of a disk player to transmit the normal rotation of the spindle motor thereto.

In the clock pulse generator of FIG. 2, when the frequency of the reproduction clock pulses of the PLL circuit 16 enters the first predetermined range so that the first frequency lock signal is generated, the reproduction clock pulses output from the PLL circuit 16 are supplied to the spindle servo circuit of FIG. 3 as input clock pulses in place of the master clock pulses. Therefore, the A/D converter 12, edge interval detector 22, synchronizing detector 23, synchronizing protector 29 and synchronous interval measuring unit 30 are operated in response to the reproduction clock pulses. Even when the reproduction clock pulses are supplied as the input clock pulses, the spindle control signal is supplied from the first comparison operator 26 to the D/A converter 33 through the switch 27 in the same manner as above if the enabling signal is absent. If the enabling signal is present, the spindle control signal is supplied from the second comparison operator 31 to the D/A converter 33 through the switch 27.

As described above, in the initial state, the detection of the interval of the synchronous signals is performed by using the master clock pulses. Therefore, if the interval between synchronous signals is given as nT, the detection accuracy is $(n\pm1)T$ even for a correct interval of the synchronous signals. As a result, the interval between synchronous signals, i.e., the rotational accuracy at the time of rough spindle control based on the spindle control signal from the first comparison operator 26 is estimated at $(n\pm2)T$ in consideration of a fluctuation of $\pm1T$ resulting from further error in controlling the spindle. Consequently, when the speed of revolution of an optical disk of a CLV type is high, the following condition is required in order to accurately distinguish between the synchronous pit and the maximum inversion interval mT of the data where mT=8T:

$$(n-2)T>8T$$

On the other hand, if the speed of revolution of the optical disk is low, the following condition must be satisfied so as not to mistake the maximum inversion interval 8T of the data for the synchronous pit:

$$8T\times(n+2)/n<nT$$

The minimum integer n which satisfies both expressions is 11. Hence, the length of the synchronous pit is preferably set to be 11T.

It should be noted that, in the above example, the maximum inversion interval mT is defined to be 8T, and then, the detection error to be generated in reading the synchronous pit and detecting it as the synchronous signal is defined to be 2T. However, these are not necessarily limited to such values.

Also, when the maximum inversion interval between the recorded marks is detected from the read signal in order to detect the synchronous marks, the detecting zone is made longer than the interval where the synchronous marks appear at the rotational speed of the disk being at its minimum.

As described above, according to an optical disk of the present invention, an integer n is set to satisfy the two expressions, $(n-\alpha)T>mT$ and $mT\times(n+a)/n<nT$, where one pit interval of the data is T; the length of the synchronous mark in the track direction is nT; the maximum detection error generated when reading the synchronous marks is $\alpha T$; and the maximum inversion interval between the marks is mT. Therefore, it is possible to set the length of a synchronous mark in consideration of the detection error and varying speed of revolution of the disk. As a result, even in the case of an optical disk of a CLV type, the synchronous pattern formed by a single mark can be detected while distinguishing it accurately from the maximum inversion interval in the data.

What is claimed is:

1. A spindle servo circuit for controlling rotational speed of an optical disk through a spindle motor in an apparatus for playing said optical disk, said optical disk comprising a synchronous mark for a synchronizing signal, and a data field for recording data on each track;

wherein, if:

a length of one pit interval of said data is given by T;

a length of said synchronous mark in a direction of the track is given by nT (where n is an integer);

a maximum detection error generated when reading said synchronous mark is given by $\alpha T$; and a maximum inversion interval between recorded marks with respect to said data is given by mT, the integer n is set to satisfy the following two expressions:

$$(n-\alpha)T>mT$$

$$mT\times(n+\alpha)/n<nT,$$

where $\alpha \geq 2$, and said spindle servo circuit comprising:

inversion interval detecting means for detecting an inversion interval indicative of said synchronous signal from a signal which is optically read from said optical disk by a pickup;

means for generating a spindle control signal based on an output of said inversion interval detecting means and a reference value indicative of a predetermined time length; and means for driving said spindle motor in accordance with said spindle control signal.

2. A spindle servo circuit according to claim 1, wherein said inversion interval detecting means binarizes the optical read signal and detects said inversion interval from the binarized signal.

* * * * *

UNITED STATES PATENT AND TRADEMARK OFFICE
CERTIFICATE OF CORRECTION

PATENT NO.: 5,740,152
DATED: April 14, 1998
INVENTOR(S): Fumihiko YOKOGAWA and Hideki HAYASHI It is certified that errors appear in the above-identified patent and that said Letters Patent is hereby corrected as shown below:

Column 1, line 27, delete "pit" and insert --bit--;

Column 1, line 54, delete "pit" and insert --bit--;

Column 2, line 12, delete "pit" and insert --bit--;

Column 2, line 46, delete "pit" (second occurrence) and insert --bit--;

Column 8, line 7, delete "pit" and insert --bit--;

Column 8, line 25, delete "pit" and insert --bit--.

Signed and Sealed this

Thirtieth Day of November, 1999

Attest:

Attesting Officer

Q. TODD DICKINSON

Acting Commissioner of Patents and Trademarks